(12) United States Patent
Steinbeck (10) Patent No.: US 7,037,027 B2
(45) Date of Patent: May 2, 2006

(54) BOLTED CONNECTION OF TWO COMPONENTS WITH ALIGNMENT COMPENSATION IN THREE DIMENSIONS

(75) Inventor: Herbert Steinbeck, Hamburg (DE)

(73) Assignee: Airbus Deutschland GmbH, Hamburg (DE)

(*) Notice: Subject to any disclaimer, the term of this patent is extended or adjusted under 35 U.S.C. 154(b) by 190 days.

(21) Appl. No.: 10/819,807

(22) Filed: Apr. 6, 2004

(65) Prior Publication Data

US 2005/0117966 A1 Jun. 2, 2005

(30) Foreign Application Priority Data

Nov. 14, 2003 (DE) ................ 103 53 376

(51) Int. Cl.
*F16D 1/00* (2006.01)
(52) U.S. Cl. ............... 403/408.1; 403/296; 403/297; 403/374.1; 403/374.2; 403/374.3; 403/374.4; 411/271; 411/325; 411/398; 411/539; 411/546
(58) Field of Classification Search ............. 411/539, 411/398, 546, 325, 271; 403/296, 297, 314, 403/408.1, 374.1, 374.2, 374.3, 374.4
See application file for complete search history.

(56) References Cited

U.S. PATENT DOCUMENTS

| | | | | |
|---|---|---|---|---|
| RE34,033 E | * | 8/1992 | Godette | ............... 411/398 |
| 5,340,258 A | * | 8/1994 | Simon | ............... 411/546 |

FOREIGN PATENT DOCUMENTS

| | | |
|---|---|---|
| AT | 409 789 | 11/2002 |
| DE | 33 33 092 | 3/1985 |
| DE | 200 05 265 | 7/2000 |
| DE | 100 08 828 | 9/2001 |
| EP | 1 245 835 | 10/2002 |

* cited by examiner

*Primary Examiner*—Daniel P. Stodola
*Assistant Examiner*—Michael P. Ferguson
(74) *Attorney, Agent, or Firm*—W. F. Fasse; W. G. Fasse (57) ABSTRACT

A connection arrangement accommodates misalignments in three dimensions, and achieves a positive fixed connection between two components. A threaded standoff with a first bolt hole therein is partially screwed into a threaded hole in the first component and protrudes to match the spacing distance between the components. Inner and outer eccentric disks are received and supported in a hole in the second component. The inner disk has an offset center relative to the outer disk, and has a second bolt hole offset from the inner disk's center. Rotating the two disks accommodates radial misalignments to bring the two bolt holes into alignment. A bolt shaft extends through the bolt holes. While a bolt head or nut at one end of the shaft bears against the eccentric disks, a clamping cone at the opposite end of the shaft is tightened to axially clamp the standoff against the second component, and to radially outwardly spread and clamp the standoff against the internal threading of the first hole in the first component. The first hole can be in a threaded sleeve secured in the first component, and the second hole can be in a clamping sleeve secured in the second component. The second hole may be a recessed stepped hole.

24 Claims, 3 Drawing Sheets

BOLTED CONNECTION OF TWO COMPONENTS WITH ALIGNMENT COMPENSATION IN THREE DIMENSIONS

PRIORITY CLAIM

This application is based on and claims the priority under 35 U.S.C. §119 of German Patent Application 103 53 376.1, filed on Nov. 14, 2003, the entire disclosure of which is incorporated herein by reference.

FIELD OF THE INVENTION

The invention relates to a mechanical connection of two components to each other using a bolt, while allowing alignment compensation of alignment deviations between the two components, and achieving a form-locked positive play-free fixed connection.

BACKGROUND INFORMATION

Various different arrangements for achieving a positive form-locked and play-free mechanical connection between two components are known. Particularly, such known mechanical connections also allow for alignment compensation between the two components, but only with respect to two planes or in two dimensions or directions. In other words, the known mechanical connections allow for a compensation of mis-alignments along two axes, but not along the third axis or dimension. Such dimensional or alignment deviations between the two components can arise due to construction or structural tolerances and/or equipment and tool tolerances of the production means used for fabricating the components that are to be connected. Dimensional and alignment tolerances can also arise later due to material strain or the like of the components.

Any effort to compensate for dimensional or alignment deviations in the third dimension with conventional screw or bolt connections requires the use of additional mechanical connecting members, shims, brackets, or the like. In any event, known solutions of mechanical connections of this type comprise several individual parts or elements that must be combined to establish the overall connection arrangement. As a result, the connection has a relatively high volume or space requirement for its parts and particularly for the installation thereof. Moreover, for the same reasons, the known connection arrangements are complicated, expensive, and require a high effort and time for the installation thereof. Another disadvantage is the relatively high total weight of such connection arrangements due to the additional individual parts that are needed.

SUMMARY OF THE INVENTION

In view of the above, it is an object of the invention to provide a connection arrangement as well as a method of assembling or installing the same, for connecting two components while compensating for any positional, dimensional, or alignment deviations of the two components along three axes, i.e. in three dimensions, within a prescribed adjustment or compensating range. Furthermore, it is an object of the invention to provide such a connection arrangement and method, whereby a positive form-locked play-free rigid and stable joint of the two components is achieved, in a manner that is robust and durable, without being released or loosened by external influences such as vibrations, temperature variations, moisture, or the like. The invention further aims to avoid or overcome the disadvantages of the prior art, and to achieve additional advantages, as apparent from the present specification. The attainment of these objects is, however, not a required limitation of the present invention.

The above objects have been achieved according to the invention in an arrangement for mechanically connecting first and second components, whereby the first component has an internally threaded first hole therein, and the second component has a second hole therein. The two holes may be axially aligned with each other, or misaligned with respective radially offset axes within a predefined tolerance range. Also, the axial spacing distance between the two components may be any spacing distance within a predefined spacing distance range. Throughout this specification, the term "axial" refers to a direction along or parallel to the axis of the bolt that will secure the arrangement, while the term "radial" refers to directions extending radially relative to the axial direction.

In order to mechanically connect the two components even with such misalignment or deviations in three dimensions (i.e. one axial dimension relating to the spacing distance between the components, and two orthogonal radial dimensions relating to the alignment or misalignment of the two holes of the two components), the inventive mechanical connection arrangement includes a threaded standoff, an eccentric arrangement including inner and outer eccentric disks, and a bolt arrangement including a bolt shaft with a threading, a clamping cone at one end of the shaft, and a head or nut at the other end of the shaft.

The externally threaded standoff is screwed to a variable or adjustable extent into the internally threaded first hole of the first component, so that a portion of the standoff protrudes from the first component and braces against the second component. This establishes the variable or compensated spacing distance between the two components.

The outer and inner eccentric disks of the eccentric arrangement preferably each have a circular outer contour in section. To achieve a variable eccentric camming or offsetting action, the inner eccentric disk is received rotatably within a disk hole or recess of the outer eccentric disk, at an eccentric offset position (i.e. with the center of the inner eccentric disk offset from the center of the outer eccentric disk). Furthermore, the inner eccentric disk has a bolt hole passing therethrough at an eccentric position (i.e. with the center of the bolt hole offset from the center of the inner eccentric disk). The inner disk can be rotated in the disk hole of the outer disk, and the outer disk can be rotated in the second hole of the second component, to thereby variably locate the bolt hole at any selected position within a circular alignment compensation range around the center of the outer eccentric disk, which coincides with the center of the second hole in the second component.

The bolt shaft of the bolt arrangement passes through the bolt hole of the inner eccentric disk, and through another bolt hole in the threaded standoff. At one end of the bolt shaft, the bolt head or nut is braced against the eccentric arrangement, which in turn is braced against the outwardly directed rim of the second component bounding the second hole. At the opposite end of the bolt shaft, the clamping cone is wedged into an inner opening of the threaded standoff. When the bolt arrangement is tightened, the clamping cone exerts an axial clamping force along the axis of the bolt arrangement to tightly clamp the standoff against the second component, and simultaneously exerts a radially outwardly directed wedging force or spreading force against the threaded annular cylindrical body of the standoff, to thereby tightly clamp or lock the threaded standoff into the threaded hole of the first component.

In this manner, any misalignments between the two components within the permissible range in three dimensions can be accommodated, and the two components are tightly secured in a play-free and positive form-locked manner.

Depending on the material and structure of each component, the hole provided therein can be directly in the component (e.g. a bored hole or a threaded hole in a metal component), or can be a hole provided in a sleeve secured in a larger opening in a component body of the component (e.g. a hole provided in a metal sleeve fixed into a larger opening in a lightweight hollow core panel component or a fiber reinforced composite component or the like, for reasons of strength).

In order that the arrangement can be essentially hidden from visual appearance, the various parts can be recessed into the holes, whereby the second hole in the second component may be a recessed stepped hole, and then the connection can be covered with external cover plates.

To allow for a larger in-plane radial misalignment compensation range, the threaded standoff may include a flange protruding radially outwardly beyond the threaded cylindrical annular body of the standoff. Such a radially enlarged flange or disk ensures that the rim or boundaries around the second hole in the second component will be firmly supported against this flange of the standoff, even when the eccentric arrangement is adjusted to position the bolt axis at the greatest achievable radial offset from the axial centerline of the second hole.

In order to enhance the radial spreading or wedging effect of the threaded standoff being clamped radially outwardly against the internal threading of the first hole of the first component, the end of the threaded standoff facing away from the second component can be radially tapered to become thinner toward the end, and can be provided with axially extending slots, so that the end portion of the threaded standoff is provided with plural separate tabs forming a castellated configuration. This allows the separate tabs to be more easily wedged or spread outwardly. Also, the bolt arrangement may comprise the clamping cone as a conically configured bolt head permanently fixed on one end of the bolt shaft with a threaded nut on the opposite end, or preferably may comprise the clamping cone provided with an internal threading being threaded onto one end of the bolt shaft in the manner of a cone-shaped nut with a fixed bolt head on the opposite end of the shaft.

The above objects have further been achieved according to the invention in a method of installing, aligning or adjusting, and then securing the above described mechanical connection arrangement. The method involves screwing the threaded standoff into the threaded first hole of the first component to the proper extent for the proper adjusted spacing distance compensation as mentioned above. Next, the eccentric arrangement is adjusted to align the bolt hole of the eccentric arrangement with the bolt hole of the threaded standoff. Next, the bolt arrangement is inserted through the bolt holes, and the bolt arrangement is tightened so as to apply an axial clamping effect along the axis of the bolt shaft between the two components, and a radial spreading and clamping effect of radially outwardly spreading the threaded standoff against the internal threading of the first hole of the first component.

BRIEF DESCRIPTION OF THE DRAWINGS

In order that the invention may be clearly understood, it will now be described in connection with an example embodiment thereof, with reference to the accompanying drawings, wherein.

DETAILED DESCRIPTION OF A PREFERRED EXAMPLE EMBODIMENT AND OF THE BEST MODE OF THE INVENTION

The inventive connection arrangement is for mechanically connecting a first component 33 with a second component 34, via an internally threaded first hole 23 provided in the first component 33 and an unthreaded second hole 24 provided in the second component 34. Depending on the material and structure of each component 33 and 34, the respective first and second holes 23 and 24 can be provided either directly in the material of the respective component, or in a further sleeve inserted and fixed into a larger opening in a component panel or body of the component. On the one hand, if the respective component 33 or 34 is made of a solid strong metal, then the threaded first hole 23 or the unthreaded second hole 24 can be provided directly as a respective bored hole in the metal body of the respective component 33 or 34. On the other hand, if the body of the component 33 or 34 has a structure or consists of a material with insufficient strength for supporting and securing the inventive connection arrangement, then a stronger or tougher insert or sleeve must be provided and fixed into the component body, with the first and second holes 23 and 24 provided in these sleeves.

In the illustrated example embodiment, the components 33 and 34 each comprise a component panel or component body 3 and 4 respectively, for example made of a lightweight hollow-core structure or a fiber reinforced composite material, or the like, as well as an internally threaded sleeve 1 secured in a larger opening 18 of the first component body 3, and a clamping sleeve 2 secured in a larger opening 19 of the second component body 4. In this regard, the sleeves 1 and 2 may, for example, be made of a metal alloy to provide the required strength for supporting and durably holding and maintaining the mechanical connection of the component bodies 3 and 4.

Each sleeve 1 or 2 may be configured and secured to the respective component body 3 or 4 in the manner of a glued-in sleeve, a welded-in sleeve, a grommet, a rivet, a two-part snap-secured sleeve, a two-part screwed-together sleeve, or any conventionally known structure for securing a sleeve to a component. In this regard, in the illustrated embodiment, each sleeve 1 or 2 includes a substantially annular cylindrical sleeve body, as well as two radially protruding flanges at opposite ends thereof, such that the radially protruding flanges secure the respective sleeve 1 or 2 on opposite sides of the respective component body 3 or 4, i.e. around a rim bordering the respective component openings 18 or 19 on both sides of the respective component body.

Figure 1:
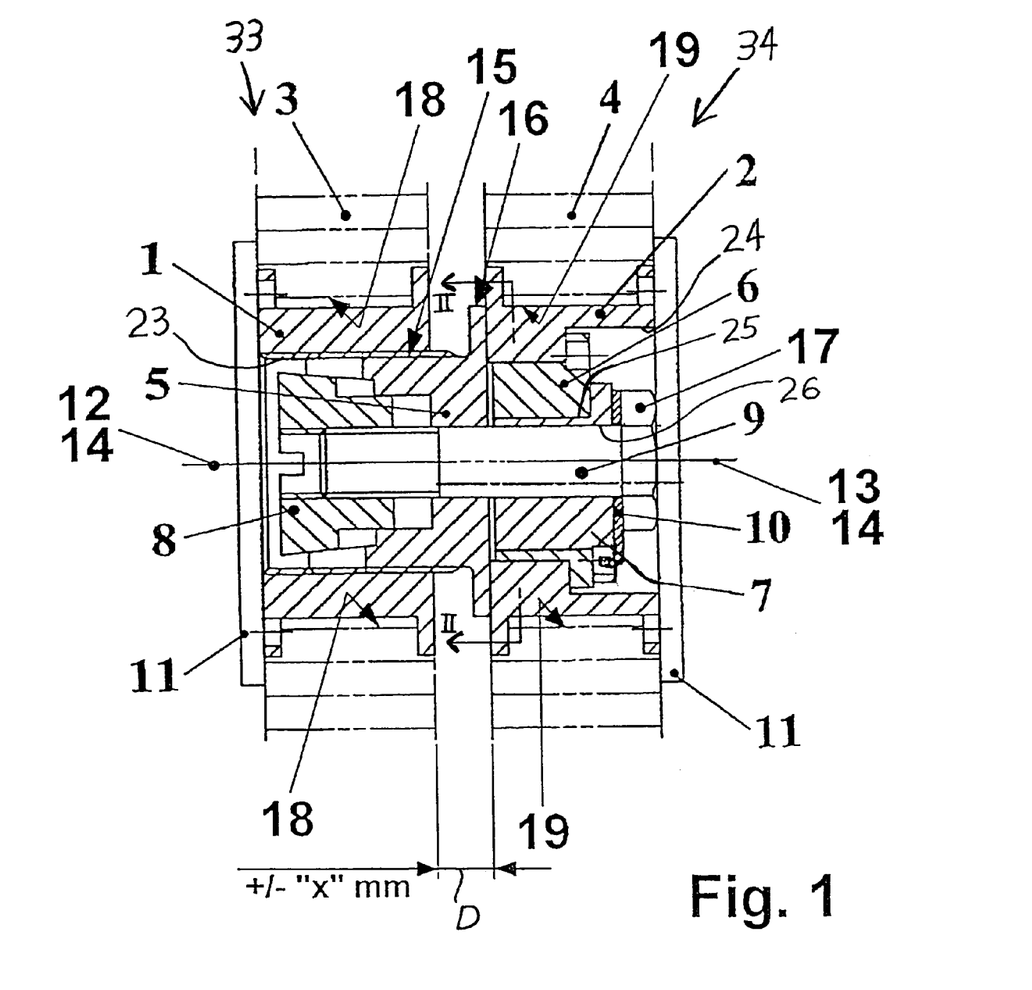
FIG. 1 is a schematic axial sectional view of a connection arrangement according to the invention installed in two components to be connected, in a condition in which the holes of the two components are axially aligned with each other.

Thus, in the illustrated embodiment, the internally threaded first hole 23 of the first component 33 is provided on the interior of the hollow annular threaded sleeve 1, while the second hole 24 of the second component 34 is provided in the annular clamping sleeve 2. Further, the second hole 24, which is not threaded, is preferably provided as a stepped recessed hole as shown in FIG. 1, with a larger diameter hole portion transitioning to a smaller diameter hole portion, with a stepped shoulder or internal rim therebetween. This rim allows the inventive connection arrangement to be seated or braced thereagainst as will be described below, while simultaneously allowing all parts of the inventive connection arrangement to be recessed below the surface contour of the second component 34. This recessed hole configuration is merely optional, however, because instead the connection arrangement could be braced against the outer rim around a simple uniform cylindrical hole at the outer surface of the second component 34.

The inventive connection arrangement includes an externally threaded generally cylindrical standoff 5, an eccentric arrangement including an outer eccentric disk 6 and an inner eccentric disk 7, and a bolt arrangement that includes a (at least partially) threaded bolt shaft 9, a bolt head or nut 17, and a clamping cone 8. Preferably, the connection arrangement further comprises a securing washer 10. The bolt arrangement may involve the clamping cone 8 permanently fixed at a first end of the threaded shaft 9, whereby a threaded nut 17 is provided at the opposite second end of the threaded bolt shaft 9. Alternatively, and preferably as shown in the illustrated embodiment, the bolt arrangement involves a bolt head 17 permanently and fixedly arranged at the second end of the bolt shaft 9, with the clamping cone 8 having an internal threading that is threaded onto the external threading on the opposite first end of the bolt shaft 9. Finally, the arrangement may additionally include one or two cover plates or caps 11 arranged, e.g. snap-fit or screwed into place, on the outer sides of the sleeves 1 and 2, in order to cover and hide all parts of the inventive connection arrangement.

The particular arrangement and installation of the several parts of the inventive embodiment illustrated herein will now be discussed with reference particularly and initially to FIG. 1. To begin the installation of the connection arrangement according to the invention, the two components 33 and 34 are first provided respectively with the first hole 23 and the second hole 24 as discussed above, particularly in this embodiment involving the installation and securing of the threaded sleeve 1 into the first component body 3 and the clamping sleeve 2 into the second component body 4.

Figure 2:
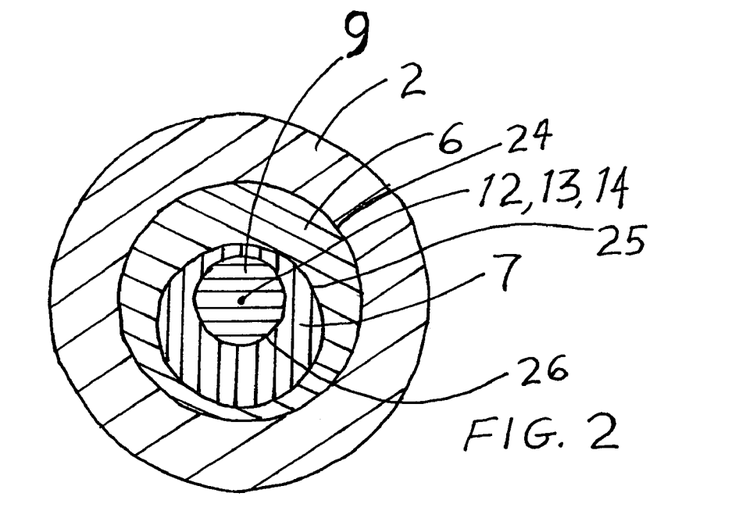
FIG. 2 is a schematic cross-section of the eccentric arrangement of the connection arrangement, as seen along section line II—II of FIG. 1.
Figure 3:
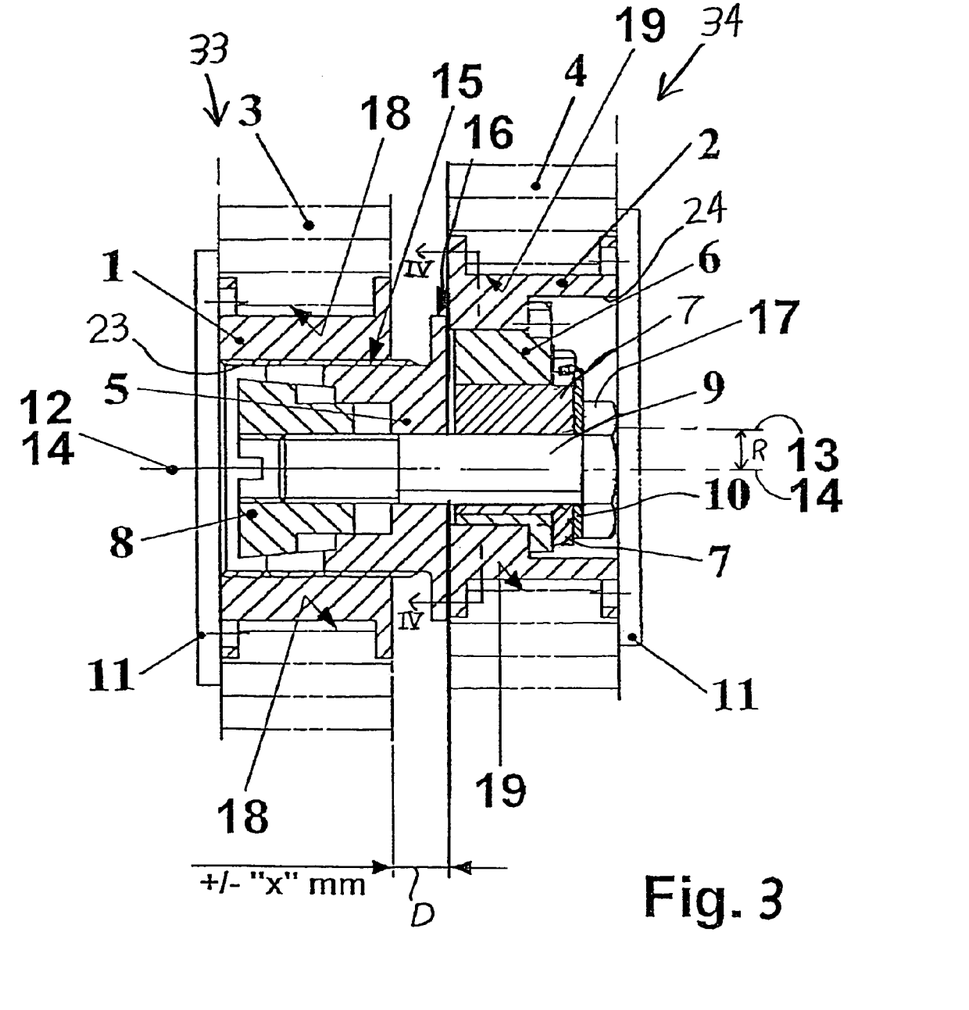
FIG. 3 is a view similar to that of FIG. 1, but showing the inventive connection arrangement in a condition in which the two holes of the two components are not axially aligned with each other.
Figure 4:
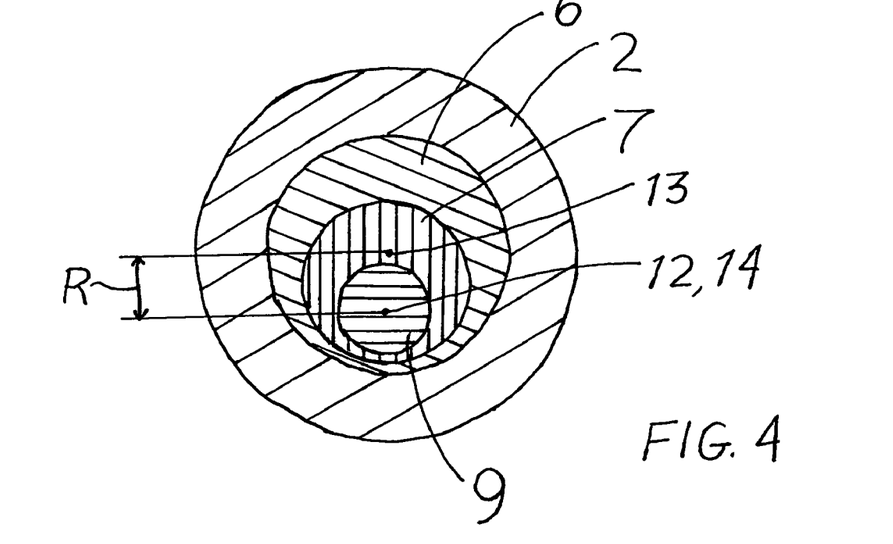
FIG. 4 is a schematic cross-sectional view of the eccentric arrangement of the connection arrangement as seen along the section line IV—IV of FIG. 3.

The two components 33 and 34 will need to be positioned for establishing the connection. In this context, the two components 33 and 34 must be positioned and aligned with one another at least within the permissible tolerance compensation range of the inventive arrangement in three axes or dimensions. Namely, the spacing distance D between the two components 33 and 34 must be within a permissible spacing distance range, and the two axes 12 and 13 of the holes 23 and 24 in the two components 33 and 34 must be axially aligned with one another, or radially offset by no more than the permissible radial compensation range. In this regard, FIGS. 1 and 2 show a perfect axial alignment of the two axes 12 and 13 of the two holes 23 and 24 of the first component 33 and the second component 34, while FIGS. 3 and 4 show a maximum permissible degree of radial offset or misalignment of these two hole axes 12 and 13 in one radial direction. Note that the bolt axis 14 coincides with both hole axes 12 and 13 in the aligned condition of FIGS. 1 and 2, but coincides only with the first hole axis 12, but not the second hole axis 13 in the misaligned condition shown in FIGS. 3 and 4.

The first step of installing and assembling the inventive connection arrangement is to screw the externally threaded standoff 5 into the internally threaded first hole 23 in the threaded sleeve 1 of the first component 33. The threaded standoff 5 may simply be a hollow annular cylindrical pipe or tube section threaded on the outside thereof. However, preferably, as shown in the drawings, the standoff 5 preferably includes a substantially annular cylindrical body 15 having the external threading thereon, and a radially protruding flange or disk 16 on the end of the cylindrical body 15 oriented toward the second component 34. The cylindrical body 15 and the flange or disk 16 may be integral portions of a unitary or monolithic construction forming the standoff 5 as illustrated, or these two parts 15 and 16 may be individual separate discrete parts such as a separate cylindrical pipe body 15 and a separate washer disk 16. In any event, the radially larger or protruding flange or disk 16 provides a larger contact surface with respect to the second component 34, and particularly the clamping sleeve 2 thereof. This enlarged contact surface also provides an enlarged radial compensation range, to ensure sufficient overlapping contact between the standoff 5 and the clamping sleeve 2, even in situations of radial misalignment of the two hole axes 12 and 13 (see e.g. FIG. 3).

As shown in FIG. 1, the axial bored hole through the flange disk 16 forming a first bolt hole may have a smaller diameter than the hollow center bore of the cylindrical body 15, but the inner diameters of these two parts 15 and 16 may also be equal to each other, i.e. provided by a uniform central bore. Preferably, the central bore hole in the flange disk 16 is a fitting hole for the diameter of the bolt shaft 9 that will be inserted therethrough, as described below, in order to provide a positive form-locked positioning or fixing of the bolt shaft 9 in the radial directions.

The standoff 5 is screwed or threaded into the threaded sleeve 1 to a selected variable extent, so that the distance by which the flat end contact face of the standoff 5, i.e. the contact face of the flange disk 16, protrudes from the surface of the threaded sleeve 1 facing toward the second component 34 corresponds to the spacing distance D between the two components 33 and 34. In order to allow and compensate for a variable tolerance range of this spacing distance D, it should be apparent that the standoff 5 (at the extremes) can be threaded entirely into the threaded sleeve 1 until only the flange disk 16 protrudes from the surface of the threaded sleeve 1, or can be screwed out of the threaded sleeve 1 until only a minimum length of the threaded cylindrical body 15 needed for establishing the screw connection remains threaded into the threaded sleeve 1. Thus, the permissible compensation range of the spacing distance D can vary from a minimum corresponding to the axial thickness of the flange disk 16, to a maximum corresponding to perhaps two-thirds or even three-fourths of the total axial length of the standoff 5. For convenience of access, it should be understood that the standoff 5 is preferably threaded into the threaded hole 23 of the threaded sleeve 1 with the proper protrusion distance to establish the proper spacing distance D, already before the two components 33 and 34 are positioned adjacent to each other as shown in FIG. 1.

After the standoff 5 has been inserted and adjusted as to the spacing distance D, and the two components 33 and 34 have been positioned adjacent to one another at this spacing distance D, as described above, next the eccentric arrangement will be inserted into the second hole 24 in the clamping sleeve 2 of the second component 34. This eccentric arrangement includes the outer eccentric disk 6 and the inner eccentric disk 7, and allows for the compensation of any radial misalignment between the second hole axis 13 of the second component 34 and the first hole axis 12 of the first component 33, within the permissible radial compensation range R in opposite directions totaling 2×R (see also FIGS. 2 and 4).

In the illustrated embodiment, the two eccentric disks 6 and 7 of the eccentric arrangement are configured and arranged as follows (see especially the cross-sectional FIGS. 2 and 4). However, it should be understood that other eccentric or cam arrangements that allow for the radial compensation of any misalignment between the hole axes 12 and 13 could be used instead.

The second hole 24 is provided coaxially centered in the clamping sleeve 2. The outer eccentric disk 6 is a circular disk that is received, also coaxially centered, in the second hole 24. Namely, the center axis of the outer eccentric disk 6 corresponds with the second hole axis 13 of the second hole 24. The outer eccentric disk 6 has a circular disk hole 25 located off-center therein, and the circular inner eccentric disk 7 is rotatably received in this off-center disk hole 25 of the outer eccentric disk 6. The holes are dimensioned relative to the disks 6 and 7 so that the disk 6 can freely rotate relative to the clamping sleeve 2, and the disk 7 can freely rotate relative to the disk 6, but there is no significant free play between these components. A second bolt hole 26 is provided off-centered in the inner eccentric disk 7. In other words, the central axis of this bolt hole 26, which will correspond with the bolt axis 14 of the installed bolt, is radially offset from the center of the disk 7.

More particularly, the outer eccentric disk 6 includes a cylindrical disk body and a radially outwardly protruding flange. While the cylindrical disk body fits into the smaller-diameter portion of the second hole 24, the radially protruding flange does not, but instead is seated against the stepped rim between the smaller-diameter portion and the larger diameter portion of the second hole 24. The inner eccentric disk 7 similarly includes a cylindrical disk body that fits into the off-center hole 25 in the outer disk 6, and a radially protruding flange that is seated against the outer surface rim or the outer disk 6 around the off-center hole 25. Alternatively, instead of the eccentric disks 6 and 7 respectively having protruding flanges at their outer ends (to the right in FIG. 1), the holes 24 and 25 could be provided with radially inwardly protruding supporting rims at their bottoms (to the left in FIG. 1) to axially support the eccentric disks respectively in the holes.

Due to the rotatability of the inner disk 7 within the outer disk 6 and the rotatability of the outer disk 6 within the clamping sleeve 2, the location of the bolt hole 26 can be varied as desired anywhere within a circular range around the second hole axis 13. This range corresponds to a circular area somewhat smaller than the circular area of the outer eccentric disk 6 as can be understood from FIGS. 2 and 4.

In this context, FIGS. 1 and 2 show an adjustment of the eccentric arrangement in which the second hole axis 13 corresponds with the bolt axis 14, which will also correspond with the first hole axis 12. Namely, in this arrangement, there is no radial offset between the two components 33 and 34, i.e. the two components are perfectly aligned with respect to their hole axes 12 and 13. On the other hand, FIGS. 3 and 4 show an adjustment of the eccentric arrangement to achieve a maximum radial offset R in one radial (in this case vertical) direction between the second hole axis 13 and the bolt axis 14, which will necessarily also correspond to the first hole axis 12.

It is apparent that the adjustment of FIG. 4 can be achieved starting from the adjustment of FIG. 2, simply by rotating the inner eccentric disk 7 by 180°, without rotating the outer eccentric disk 6. If one would make a further adjustment in comparison to FIG. 4, by rotating the outer eccentric disk by 180°, then the bolt axis 14 would be shifted to the opposite (vertical upper) maximum offset position relative to the second hole axis 13. Thus, the maximum permissible radial compensation range that can be accommodated between the two components 33 and 34 is twice the radial offset R shown in FIG. 4.

By selectively rotating both of the disks 6 and 7 by various angular amounts, the bolt axis 14 can be positioned anywhere within a circle defined by this maximum radial compensation range about the second hole axis 13. Thus, if the bolt axis 14 extends horizontally as exemplified in FIG. 1, the radial adjustments can be carried out both vertically (up or down) and horizontally (left or right) in the plane of FIGS. 2 and 4. These adjustments accordingly provide a free range of compensation in two additional dimensions or axes, in addition to the axial adjustment provided along the bolt axis 14 to compensate for the spacing distance D using the standoff 5 as described above.

After the above radial adjustments have been carried out so that the second bolt hole 25 in the inner eccentric disk 7 aligns with the first bolt hole provided in the threaded standoff 5 (i.e. to establish a single common bolt axis 14 aligned with the first hole axis 12 of the first component 33), a bolt arrangement is inserted through these aligned bolt holes. The bolt arrangement includes a bolt shaft 9 with an external threading, a clamping cone 8 at a first end of the bolt shaft 9, and a bolt head or a nut 17 on the opposite second end of the bolt shaft 9. In the preferred illustrated embodiment, the bolt arrangement includes a bolt head 17 permanently fixed to the second end of the bolt shaft 9, while the clamping cone 8 is provided with a central bore having an internal threading, so that the clamping cone 8 is threaded or screwed onto the external threading at the first end of the bolt shaft 9. Alternatively, the clamping cone 8 could be permanently fixed at the first end of the bolt shaft 9 in the manner of a conical bolt head, while a nut 17 with an internal threading is screwed or threaded onto the externally threaded second end of the bolt shaft 9.

In the illustrated preferred embodiment, a non-rotatable security washer 10 is arranged between the bolt head 17 and the facing outer surface of the inner eccentric disk 7. The washer 10 is fixed against rotation relative to the inner eccentric disk 7. Once the bolt arrangement is tightened, the washer 10 prevents loosening of the bolt head 17, and prevents relative rotation between the bolt head 17 and the inner eccentric disk 7.

When the clamping cone 8 is turned or screwed onto the threading at the first end of the bolt shaft 9, this exerts an axial tension between the clamping cone 8 and the bolt head 17, which firmly clamps the second component 34 against the threaded standoff 5 in a positive form-locked manner. Namely, the bolt head 17 applies a positive clamping force (toward the left in FIG. 1) onto the washer 10, from the washer 10 onto the radially protruding flange of the inner eccentric disk 7, and from there onto the outer eccentric disk 6, which is thus pressed or clamped with its radially protruding flange onto the radially inwardly stepped shoulder or rim of the stepped recessed second hole 24 in the clamping sleeve 2. Thereby, the clamping sleeve 2 is positively held in a form-locked manner and pressed (toward the left in FIG. 1) against the flange disk 16 of the standoff 5. Meanwhile, the clamping cone 8 exerts an axial force (to the right in FIG. 1) in a form-locked manner against the cylindrical body 15 of the threaded standoff 5. Thereby, the threaded standoff 5 is positively secured in the axial direction onto the clamping sleeve 2 of the second component 34.

Also, the standoff 5 is positively fixed in a form-locked manner to the clamping sleeve 2 with respect to all radial directions, because the eccentric arrangement has been adjusted and then fixed via the tightened bolt and the security washer 10 to prevent any shifting or readjustment of the eccentric arrangement. Since the second bolt hole 26 in the eccentric arrangement and the corresponding first bolt hole in the standoff 5 are fitting holes without play relative to the bolt shaft 9, and since the eccentric disks 6 and 7 are received without play in the respective holes 24 and 25, no radial shifting of the arrangement is possible.

Meanwhile, tightening the clamping cone 8 onto the threaded bolt shaft 9 further exerts a radially outward wedging or spreading effect onto the threaded rim of the circular body 15 of the standoff 5. As described above, this threaded rim is preferably slotted to form a castellated configuration with individual tabs, which can be more readily pressed radially outward by the wedging action of the clamping cone 8. Thereby, the threaded engagement between the standoff 5 and the threaded first hole 23 in the threaded sleeve 1 is tightly clamped and fixed. Thus, the threaded standoff 5 is securely fixed to the threaded sleeve 1 of the first component 33. In this regard, the end portion of the cylindrical body 15 of the standoff 5 is preferably tapered, in that the hollow interior has a conically tapering configuration matching the conical taper of the clamping cone 8. This facilitates the radially outwardly directed conical wedging effect of the clamping cone 8 to spread the end portion of the standoff 5. The hollow interior of the cylindrical body 15 of the standoff 5 may further have a radially stepped configuration, with a cylindrical bore portion dimensioned to receive, guide, and radially hold a cylindrical portion of the clamping cone 8. Namely in this regard, the clamping cone 8 includes a conically tapering portion and the just mentioned cylindrical portion.

The overall result is a positive fixed connection between the second component 34 and the first component 33, which allows for and compensates axial and radial tolerances or misalignments between the components as discussed above.

The tightening of the bolt arrangement can preferably be carried out with conventionally available tools, such as wrenches, hex sockets, allen wrenches, screwdrivers, etc. For this purpose, the bolt head 17 may be a common hex head, for example. The clamping cone 8 may be provided with tool engagement configurations, such as an external hex head, or an internal hex allen socket, or a screwdriver slot (as schematically illustrated) or the like.

Once the arrangement has been secured in the above described manner, then cover plates 11 may be arranged and secured on the outer surfaces of the components 33 and 34, in order to cover and visually hide the connection arrangement. These covers 11 may be snap-fit onto or into suitable fitting configurations of the sleeves 1 and 2, or can be secured in any other conventionally contemplated manner.

While FIGS. 1 and 2, as primarily discussed above, show the arrangement for a situation of zero radial misalignment (i.e. perfect alignment of the two hole axes 12 and 13), FIGS. 3 and 4 show the same inventive arrangement adjusted for a situation in which the second hole axis 13 is radially offset from the first hole axis 12. As discussed above, and as can be seen in FIGS. 3 and 4, this radial offset or misalignment can be easily accommodated and compensated for by suitably adjusting the eccentric arrangement of the eccentric disks 6 and 7 before inserting and tightening the bolt arrangement including the bolt shaft 9, the bolt head 17 and the clamping cone 8.

As can be seen in FIG. 3, the radially enlarged flange disk 16 of the threaded standoff 5 ensures that a supporting contact surface of the flange disk 16 will always overlap the facing surface of the clamping sleeve 2, even when the eccentric arrangement is adjusted to accommodate or compensate for the maximum radial offset between the two components. This ensures that a tightly clamped and positively fixed connection can be achieved between the two components 33 and 34, regardless of misalignments between these components (within the permissible compensation ranges) in the axial direction, and in two directions perpendicular to the axial direction.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A connection arrangement for connecting first and second components that are adjacent to each other, wherein said first component has an internally threaded first hole therein, said second component has a second hole therein, and said connection arrangement comprises:

an externally threaded standoff member that has a first bolt hole therein and that is adapted to be screwed partly into said first hole and to protrude partly out of said first hole by a selectively variable protrusion distance that matches a spacing distance between said first and second components in an axial direction;

an eccentric arrangement including an outer eccentric disk and an inner eccentric disk, wherein said outer eccentric disk is adapted to be rotatably received in said second hole while being supported by said second component against being pulled through said second hole toward said first component, and wherein said inner eccentric disk is rotatably received in a disk hole in said outer eccentric disk while being supported by said outer eccentric disk against being pulled through said disk hole toward said first component, and said inner eccentric disk has a second bolt hole therein, and wherein said inner and outer eccentric disks can be selectively rotated to bring said second bolt hole into axial alignment with said first bolt hole while compensating for any misalignment of said first and second holes in radial directions within a radial compensation range; and a bolt arrangement including a bolt shaft, a clamping cone at a first end of said bolt shaft, and a bolt head or nut at a second end of said bolt shaft, wherein said bolt shaft extends axially through said first and second bolt holes, said bolt head or nut is arranged to bear axially against said eccentric arrangement, and said clamping cone is arranged to bear axially against said standoff member.

2. The connection arrangement according to claim 1, wherein a central axis of said outer eccentric disk coincides with a second hole axis of said second hole, wherein said disk hole is located off-center in said outer eccentric disk with respect to said central axis of said outer eccentric disk, and wherein said second bolt hole is located off-center in said inner eccentric disk with respect to a central axis of said inner eccentric disk.

3. The connection arrangement according to claim 1, wherein said outer eccentric disk includes a first cylindrical disk body adapted to be received in said second hole and a first flange that protrudes radially from said first cylindrical disk body and is adapted to rest and be supported on a rim of said second component around said second hole, and wherein said inner eccentric disk includes a second cylindrical disk body received in said disk hole and a second flange that protrudes radially from said second cylindrical disk body and rests and is supported against a rim of said outer eccentric disk around said disk hole.

4. The connection arrangement according to claim 1, wherein said clamping cone includes a conical shape that tapers toward said second end of said bolt shaft.

5. The connection arrangement according to claim 4, wherein an end portion of said standoff member, which is adjacent to said clamping cone and which is adapted to be screwed into said first hole of said first component, has a hollow inner space that receives said conical shape of said clamping cone at least partially therein, so that said clamping cone exerts a radially outward spreading force on said end portion of said standoff member radially outwardly against said first component in said threaded first hole.

6. The connection arrangement according to claim 5, wherein said end portion of said standoff member has a castellated configuration including end portion tabs separated by radial slots.

7. The connection arrangement according to claim 5, wherein said end portion of said standoff member comprises an annular wall with a tapering thickness that tapers toward an end of said end portion oriented away from said bolt head or nut, so that said hollow inner space flares radially outwardly wider toward said end of said end portion.

8. The connection arrangement according to claim 7, wherein said standoff member further comprises an annular cylindrical portion with a cylindrical hollow inner space therein communicating axially with said hollow inner space of said end portion and with said first bolt hole, and wherein said standoff member has a radial stepped inner shoulder formed between said end portion and said annular cylindrical portion.

9. The connection arrangement according to claim 8, wherein said clamping cone further includes a cylindrical portion with a cylindrical outer shape that is received in said cylindrical hollow inner space.

10. The connection arrangement according to claim 1, wherein said bolt head is permanently fixedly attached to said second end of said bolt shaft, said bolt shaft is externally threaded at said first end, and said clamping cone has an internally threaded hole therein, into which said first end of said bolt shaft is threadingly engaged.

11. The connection arrangement according to claim 1, wherein said standoff member includes a cylindrical body that has a cylindrical outer surface with an external threading thereon, and a flange that protrudes radially outwardly from said cylindrical body at an end thereof oriented away from said clamping cone, and wherein said flange is adapted to brace against a surface of said second component around said second hole.

12. A connection arrangement for connecting two components comprising:

a standoff member comprising a cylindrical body that has an axially extending hollow inner space including a first bolt hole, and a cylindrical outer surface with an external threading;

an eccentric arrangement that is arranged adjacent to said standoff member and that includes an outer eccentric disk and an inner eccentric disk, wherein said outer eccentric disk comprises a first cylindrical disk body and a first flange that protrudes radially outwardly from said first cylindrical disk body at an end thereof facing away from said standoff member, said outer eccentric disk has a disk hole therein, said inner eccentric disk comprises a second cylindrical disk body rotatably received in said disk hole and a second flange that protrudes radially outwardly from said second cylindrical disk body and that is supported against a surface of said outer eccentric disk at said end having said first flange, and said inner eccentric disk has a second bolt hole therein;

a bolt arrangement including a bolt shaft, a clamping cone at a first end of said bolt shaft, and a bolt head or nut at a second end of said bolt shaft, wherein said bolt shaft extends axially through said first and second bolt holes, said bolt head or nut is arranged to bear axially against said eccentric arrangement, and said clamping cone includes a conical shape that tapers toward said second end of said bolt shaft and is arranged to bear axially against said standoff member while being received at least partly in said hollow inner space of said standoff member.

13. The connection arrangement according to claim 12, wherein said disk hole is located off-center in said outer eccentric disk with respect to a central axis of said outer eccentric disk, and wherein said second bolt hole is located off-center in said inner eccentric disk with respect to a central axis of said inner eccentric disk.

14. The connection arrangement according to claim 12, wherein an end portion of said cylindrical body of said standoff member adjoining said clamping cone has a castellated configuration including end portion tabs separated by radial slots.

15. The connection arrangement according to claim 12, wherein an end portion of said cylindrical body of said standoff member adjoining said clamping cone comprises an annular wall with a tapering thickness that tapers toward an end of said end portion oriented away from said bolt head or nut, so that said hollow inner space flares radially outwardly wider toward said end of said end portion.

16. The connection arrangement according to claim 15, wherein said cylindrical body of said standoff member further comprises an annular cylindrical portion with a cylindrical hollow inner space therein communicating axially with said hollow inner space of said end portion and with said first bolt hole, and wherein said cylindrical body of said standoff member has a radial stepped inner shoulder formed between said end portion and said annular cylindrical portion.

17. The connection arrangement according to claim 16, wherein said clamping cone further includes a cylindrical portion with a cylindrical outer shape that is received in said cylindrical hollow inner space.

18. The connection arrangement according to claim 12, wherein said bolt head is permanently fixedly attached to said second end of said bolt shaft, said bolt shaft is externally threaded at said first end, and said clamping cone has an internally threaded hole therein, into which said first end of said bolt shaft is threadingly engaged.

19. The connection arrangement according to claim 12, wherein said standoff member further comprises a flange that protrudes radially outwardly from said cylindrical body at an end thereof oriented away from said clamping cone and toward said eccentric arrangement.

20. A connection arrangement comprising:
  a first component that has an internally threaded first hole therein;
  a second component that has a second hole therein, and that is arranged adjacent to said first component;
  an externally threaded standoff member that has a first bolt hole therein and that is screwed partly into said first hole and protrudes partly out of said first hole by a selectively variable protrusion distance that matches a spacing distance between said first and second components in an axial direction;
  an eccentric arrangement including an outer eccentric disk and an inner eccentric disk, wherein said outer eccentric disk is rotatably received in said second hole and is supported by said second component against being pulled through said second hole toward said first component, and wherein said inner eccentric disk is rotatably received in a disk hole in said outer eccentric disk and is supported by said outer eccentric disk against being pulled through said disk hole toward said first component, and said inner eccentric disk has a second bolt hole therein, and wherein said inner and outer eccentric disks can be selectively rotated to bring said second bolt hole into axial alignment with said first bolt hole while compensating for any misalignment of said first and second holes in radial directions within a radial compensation range; and
  a bolt arrangement including a bolt shaft, a clamping cone at a first end of said bolt shaft, and a bolt head or nut at a second end of said bolt shaft, wherein said bolt shaft extends axially through said first and second bolt holes, said bolt head or nut is arranged to bear axially against said eccentric arrangement, and said clamping cone includes a conical shape that tapers toward said second end of said bolt shaft and is arranged to bear axially against said standoff member.

21. The connection arrangement according to claim 20, wherein:
  said first component comprises a first component body with a first opening therein, and a discrete internally threaded sleeve arranged in said first opening and secured to said first component body;
  said threaded sleeve has said internally threaded first hole therein;
  said second component comprises a second component body with a second opening therein, and a discrete clamping sleeve arranged in said second opening and secured to said second component body; and
  said clamping sleeve has said second hole therein.

22. The connection arrangement according to claim 21, wherein:
  said first hole is a cylindrical hole with a single continuous uniform diameter;
  said second hole is a stepped hole including a smaller-diameter portion toward said first component and a larger-diameter portion away from said first component, with a stepped shoulder on an inner wall of said second hole between said smaller-diameter portion and said larger-diameter portion; and
  said eccentric arrangement and said bolt head or nut are received within said second hole without protruding axially outwardly beyond a surface of said second component facing away from said first component.

23. The connection arrangement according to claim 20, further comprising a cover plate arranged to cover at least one of said first hole on a surface of said first component facing away from said second component and said second hole on a surface of said second component facing away from said first component.

24. A method of assembling the connection arrangement according to claim 20, comprising the steps:
  a) screwing said standoff into said first hole in said first component to an extent so that said protrusion distance thereof matches said spacing distance;
  b) positioning said second component adjacent to said first component with said spacing distance therebetween and with said second component abutting against said standoff member;
  c) arranging said eccentric arrangement in said second hole in said second component;
  d) rotating at least one of said inner and outer eccentric disks until said second bolt hole is axially aligned with said first bolt hole;
  e) inserting said bolt shaft through said first and second bolt holes; and
  f) rotating and thereby axially tightening said clamping cone and said bolt head or nut relative to each other.

* * * * *